United States Patent [19]
Tsurumaru et al.

[11] Patent Number: 5,824,431
[45] Date of Patent: Oct. 20, 1998

[54] PORTABLE APPARATUS AND BATTERY LOCKING MECHANISM

[75] Inventors: Shinichiro Tsurumaru; Shyuzi Sasaki, both of Kawasaki, Japan

[73] Assignee: Fujitsu Limited, Kawasaki, Japan

[21] Appl. No.: 712,381

[22] Filed: Sep. 11, 1996

[30] Foreign Application Priority Data

Mar. 19, 1996 [JP] Japan .................................. 8-063537

[51] Int. Cl.⁶ .................................................. H01M 2/10
[52] U.S. Cl. ............................................. 429/97; 429/100
[58] Field of Search ...................... 429/96–100; 361/814, 361/732

[56] References Cited

U.S. PATENT DOCUMENTS 5,328,781  7/1994  Mikake .
5,608,612  3/1997  Hokao ..................................... 361/814
5,621,618  4/1997  Komiyama .............................. 361/732

*Primary Examiner*—Anthony Skapars
*Attorney, Agent, or Firm*—Armstrong, Westerman, Hattori, McLeland & Naughton

[57] ABSTRACT

A portable apparatus capable of using batteries as an energy source includes: a battery case portion including at least a first region and a second region providing a space for a first battery and a second battery, respectively, and a third region located between the first region and the second region necessary for loading and releasing only one of the first battery and the second battery, a slide member, located slidably at the third region, having an engaging portion which contacts one of the first battery and second battery, and a locking member which is engaged with the slide member when one of the first battery and the second battery is taken out from a corresponding region of the battery case portion, and locks the other battery in a corresponding region.

11 Claims, 16 Drawing Sheets

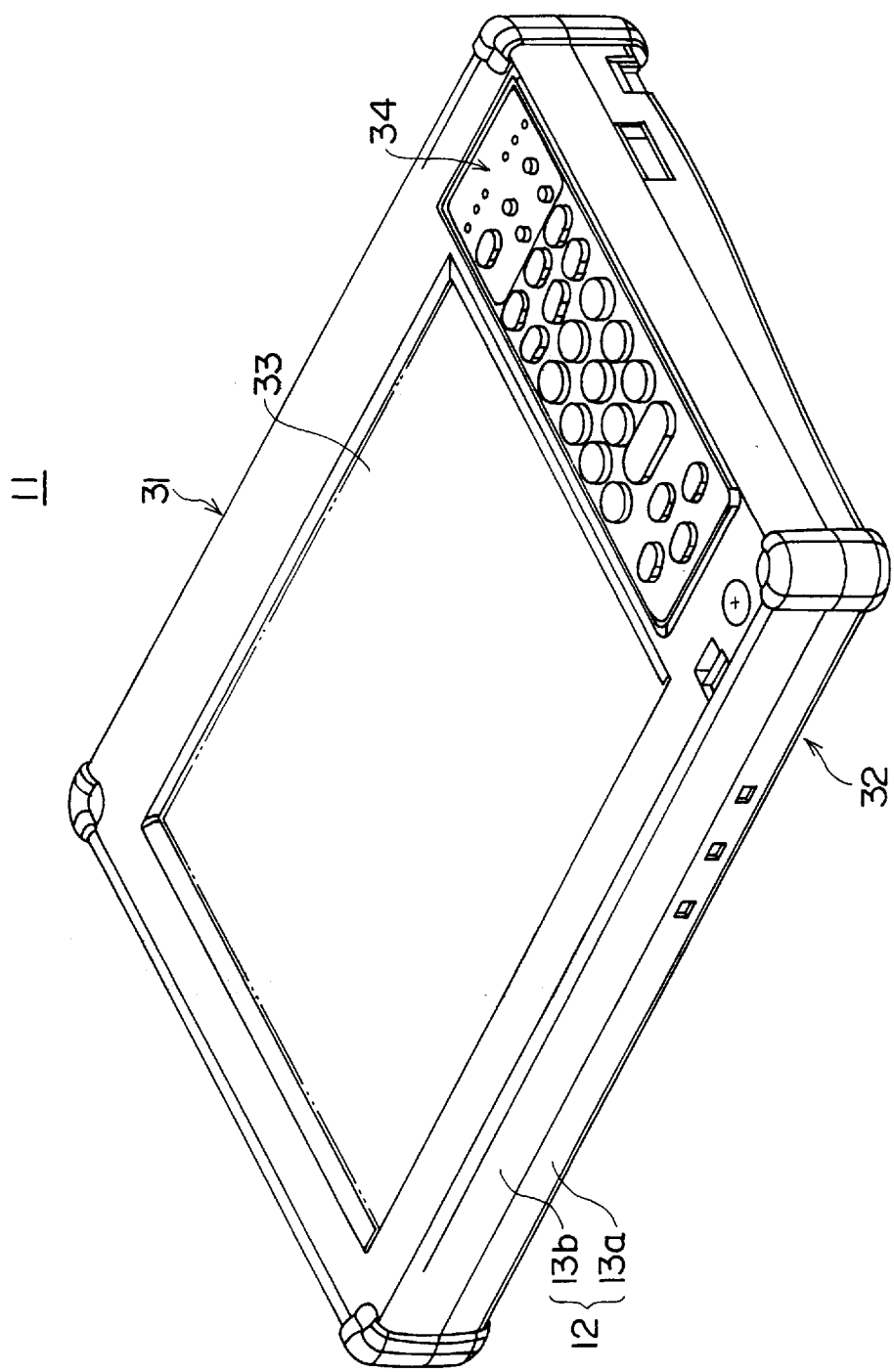

PORTABLE APPARATUS AND BATTERY LOCKING MECHANISM

BACKGROUND OF THE INVENTION

1. Field of the Invention

The present invention generally relates to portable apparatus containing batteries, and more particularly, to a portable apparatus containing batteries having a battery locking mechanism which prevents a destruction of data contained in a memory.

2. Description of the Related Art

Recently, the use of a portable apparatus having a CPU associated with memories and carrying out processes such as information processing, has been greatly increased. An example of such a portable apparatus is a handy-terminal which is a terminal apparatus that can be easily carried and is provided with, in general, input keys, a display, memories, and so on. Most of such handy-terminals are made capable of using batteries as an energy source and the batteries are usually contained in a battery case and covered with a battery cover.

When using the batteries as a power source, data stored in a memory is destroyed if a current supply is stopped due to, for instance, a battery exchange where the batteries are taken out from the battery case. Therefore, in order to protect the content of the memory, it is quite common that such apparatus are provided with a protection mechanism known as a resume function. The resume function saves the content of the memory when detecting that the batteries are taken out.

The actual mechanism of the resume function is such that, for example, when a battery cover is opened, a micro-switch provided at a predetermined position in the battery case is turned on and a resume operation is started. That is, the data in the memory is saved during the time that the battery cover is opened and the batteries are taken out.

However, a processing speed of the portable apparatus such as the handy-terminal, and a capacity of the memory thereof have been greatly increased recently. The number or the capacity of the battery has also been increased. As for such a memory with high capacity, a time period between the detection of opening up of the battery cover and the taking out of the batteries is not enough for saving all the data contained in the memory. Thus, there is a danger that some of the data will be lost due to the resume function.

SUMMARY OF THE INVENTION

Accordingly, it is a general object of this invention to provide a portable apparatus in which the above-mentioned problems are eliminated.

A more specific object of the present invention is to provide a portable apparatus having a battery locking mechanism which prevents a destruction of data contained in a memory by assuring current flow by locking at least one battery when others are taken out.

Another object of the present invention is to provide a portable apparatus whose size is maintained small compared with other similar-type portable apparatus.

The objects described above are achieved by a portable apparatus capable of using batteries as an energy source comprising: a battery case portion including at least a first region and a second region providing a space for a first battery and a second battery, respectively, and a third region located between the first region and the second region necessary for loading and releasing only one of the first battery and the second battery, a slide member, located slidably at the third region, having an engaging portion which contacts one of the first battery and second battery, and a locking member which is engaged with the slide member when one of the first battery and the second battery is taken out from a corresponding region of the battery case portion, and locks the other battery in a corresponding region.

According to the above portable apparatus, it is possible to provide the slide member and the locking member in a relatively small space since the engaging portion of the slide member, slidable in the range of the third region, may be locked by the locking member provided in a slide direction of the slide member.

The objects described above are also achieved by the above portable apparatus, wherein the locking member is fixed by a fixing portion corresponding to the third region and provided with two arm portions extending in a sliding direction of the slide member, each of which has a contacting portion which may be pushed down by a corresponding battery.

The objects described above are also achieved by the above portable apparatus wherein the locking member is further provided with hooking members one of said hooking members being engaged with the slide member when a corresponding one of the first battery and the second battery is taken out, and said hooking member being disengaged from the slide member such that the slide member is slidable when both the first battery and the second battery are loaded.

According to the above portable apparatus, since the hooking members aid a locking of the slide member in a state in which the arm portions are not bent, it is possible to provide the slide member and the locking member in a small space and a releasing of the battery may be controlled by the hooking members.

The objects described above are also achieved by the above portable apparatus wherein the slide member is moved, within a range of the width of the third region, according to the movement of one of the batteries by the presence of the engaging portion contacting the battery.

According to the above portable apparatus, it is possible to provide the slide member and the locking member in a relatively small space since the engaging portion of the slide member, slidable in the range of the third region, may be locked by the locking member provided in a slide direction of the slide member.

The objects described above are also achieved by the above portable apparatus wherein the slide member and the locking member are provided outside of the battery case portion and a first hole through which the engaging portion of the slide member is projected and second holes through which the contacting portions of the locking member are projected are formed in the battery case portion.

According to the above portable apparatus, since the engaging portion of the slide member and the contacting portions of the locking member are projected inside of the battery case portion, it is possible to provide the slide member and the locking member in a small space close to the battery case portion.

The objects described above are also achieved by the above portable apparatus wherein a predetermined number of pin terminals for electrical connection with the batteries are provided at both ends of the battery case portion.

According to the above portable apparatus, since the movement of the batteries, which are connected to the pin terminals provided at the ends of the battery case portion, must occur in the third region, it is possible to control the loading/releasing of the batteries in a small space.

The objects described above are also achieved by the above portable apparatus wherein the battery case portion is covered with a cover and detective means for detecting opening and closing of the cover is further provided.

According to the above portable apparatus, since the opening and the closing of the cover may be detected by the detective means, it is possible to avoid any problems caused by a releasing of the batteries.

The objects described above are also achieved by the above portable apparatus wherein pressing members for pressing the batteries in a direction for making electrical connection are further provided with the cover.

According to the above portable apparatus, since the batteries are pressed in a direction for making the electrical connection by the pressing members, it is possible to make sure of the electrical connection of the loaded batteries.

The objects described above are also achieved by a battery locking mechanism comprising: a battery case portion including at least a first region and a second region providing a space for a first battery and a second battery, respectively, and a third region located between the first region and the second region necessary for loading and releasing only one of the first battery and the second battery, a slide member, located slidably at the third region, having an engaging portion which contacts one of the first battery and second battery, and a locking member which is engaged with the slide member when one of the first battery and the second battery is taken out from a corresponding region of the battery case portion, and locks the other battery in a corresponding region.

According to the above battery locking mechanism, it is possible to provide the slide member and the locking member in a relatively small space since the engaging portion of the slide member, slidable in the range of the third region, may be locked by the locking member provided in a slide direction of the slide member.

Other objects and further features of the present invention will be apparent from the following detailed description when read in conjunction with the accompanied drawings.

BRIEF DESCRIPTION OF THE DRAWINGS

FIG. 3 is a perspective view of an embodiment of a handy-terminal to which the present invention is applied;

DESCRIPTION OF THE PREFERRED EMBODIMENTS

In the following, a principle and an embodiment of the present invention will be described with reference to the accompanying drawings.

Figure 1:
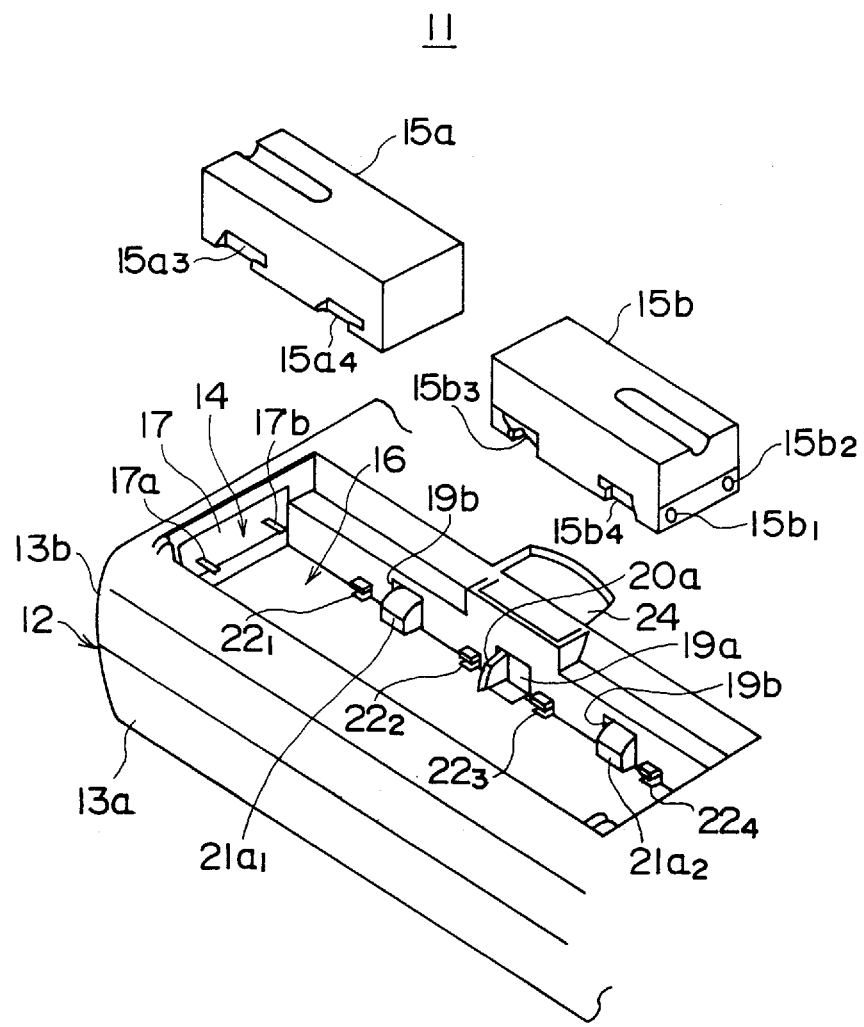
FIG. 1 is a perspective view showing a main portion of an embodiment according to the present invention.

First, a description will be given of an embodiment of a portable apparatus according to the present invention in which a handy-terminal is used as an example (the term "handy-terminal" means a personal portable unit of the type described hereinafter). FIG. 1 is a perspective view of a power supply portion of a handy-terminal 11. As shown in FIG. 1, a power supply unit 14 is formed in a lower case 13b of a housing 12 of the handy-terminal 11. That is, the power supply unit 14 is formed at the back of the apparatus.

Figure 2A:
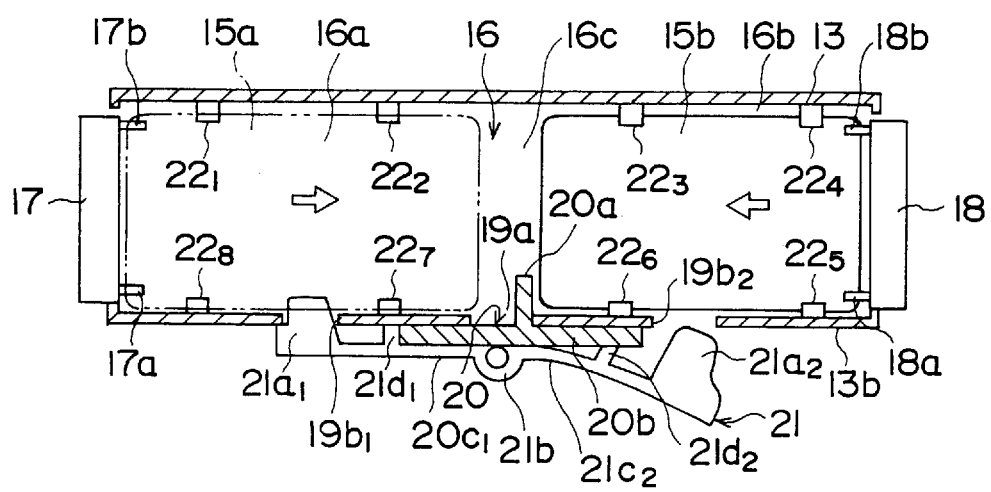
FIG. 2A is a cross-sectional view of a battery case portion according to the present invention cut along its horizontal axis.
Figure 2B:
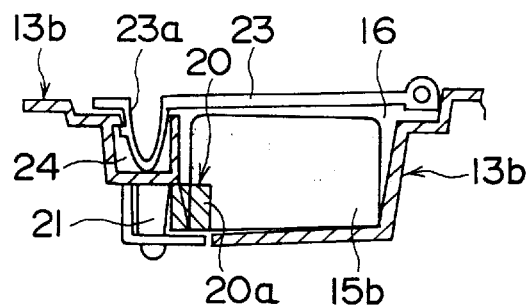
FIG. 2B is a diagram showing a cross section of the battery case portion according to the present invention cut along its vertical axis.

FIG. 2A shows a cross section of a battery case portion 16 cut along its horizontal axis and FIG. 2B is a diagram showing a cross section of the battery case portion 16 cut along its vertical axis. The power supply unit 14 is comprised of the battery case portion 16 in which a space for first and second batteries 15a and 15b and a space required for releasing one of the first and second batteries 15a and 15b are provided. That is, as shown in FIG. 2A, a first region 16a which is the space for accommodating the first battery 15a, a second region 16b which is the space for accommodating the second battery 15b and a third region 16c which is the space for loading and releasing the batteries 15a and 15b are provided with the battery case portion 16.

In FIG. 2A, terminal portions 17 and 18 are formed at respective ends of the battery case portion 16. Pin terminals 17a, 17b, 18a and 18b for connecting the battery 15a with the battery 15b are formed extending in a long axis direction of the battery case portion 16. The size of the third region 16c is determined so that it is sufficient for releasing (or loading) only one battery such that the two batteries 15a and 15b cannot be taken out at the same time.

A first hole 19a, through which an engaging portion 20a of a slide member 20 is projected, is formed in a position corresponding to the third region 16c of the battery case portion 16. The engaging portion 20a is formed so as to extend in a vertical direction relative to a base portion 20b of the slide member 20. The slide member 20 slides in a range of a width of the first hole 19a for the engaging portion 20a.

Also, a second hole $19b_1$ is formed in a position corresponding to the first region 16a and a block type contacting portion $21a_1$ is projected inwardly as shown in FIG. 2A. Similarly, a second hole $19b_2$ is formed in a position corresponding to the second region 16b and a block-type contacting portion $21a_2$ is projected inwardly. Each of the contacting portions $21a_1$ and $21a_2$ is formed with a taper and is pushed towards the outside as a battery is pushed in the battery case portion 16.

Guiding members $22_1$ to $22_8$ are integrally molded with the battery case portion 16 and each of them is engaged with a corresponding guiding groove formed in the first battery 15a or the second battery 15b. Also, the battery case portion 16 is covered with a battery cover 23 as shown in FIG. 2B.

On the other hand, a locking member 21 is provided adjacent to the slide member 20 as shown in FIGS. 21A and 21B and is fixed to a position corresponding to the third region 16c by a fixing portion 21b. Arm portions $21c_1$ and $21c_2$, which are integrally formed, extend in a sliding direction of the slide member 20 from the fixing portion 21b as a center. At the respective ends of the arm portions $21c_1$ and $21c_2$, the above-mentioned contacting portions $21a_1$ and $21a_2$ are integrally formed. Also, hooking portions $21d_1$ and $21d_2$ are integrally formed at a predetermined portion of the arm portions $21c_1$ and $21c_2$, respectively.

In FIG. 2B, the positional relationship between the slide member 20 and the locking member 21 is shown. In the same figure, the battery cover 23 whose one end is rotatably fixed to the battery case portion 16 is also shown. At the other end of the battery cover 23, a hook member 23a is formed, and an engaging concave portion 24 for the hook member 23a is formed in the lower case portion 13b.

The state shown in FIG. 2A is when the battery 15a is not loaded in the first region 16a. Therefore, the engaging portion 20a of the slide member 20 is positioned at the side of the second battery 15b and an end of the second battery is in contact with the engaging portion 20a. At this state, the contacting portion $21a_1$ of the locking member 21 is projected through the second hole $19b_1$ towards the inside of the battery case portion 16 and the contacting portion $21a_2$ is pushed outside of the case portion 16 by the second battery 15b.

Thus, the end portion of the base portion 20b of the slide member 20 is in contact with the hooking portion $21d_1$ of the arm portion $21c_1$ and it is not possible to move the second battery in a direction indicated by an arrow in the second region 16b since the slide member 20 is locked by the hooking portion $21d_1$. In order to move the slide member 20, it is necessary to insert the first battery 15a in the first region 16a to push the contacting portion $21a_1$ so that the engaging state between the base portion 20b of the slide member 20 and the hooking portion $21d_1$ is released. Once the engaging state is released, the slide member 20 can be moved by moving the second battery 15b in a direction indicated by the arrow to push the engaging portion 20a.

According to the present invention, as described above, the slide member 20 is freely movable when both the first and the second batteries 15a and 15b are contained in the battery case portion 16, and it is possible to take out one of the batteries 15a and 15b from the case portion 16. However, once one of the batteries is taken out, the locking mechanism is worked to prevent the other battery from being released from the case 16.

Figure 4:
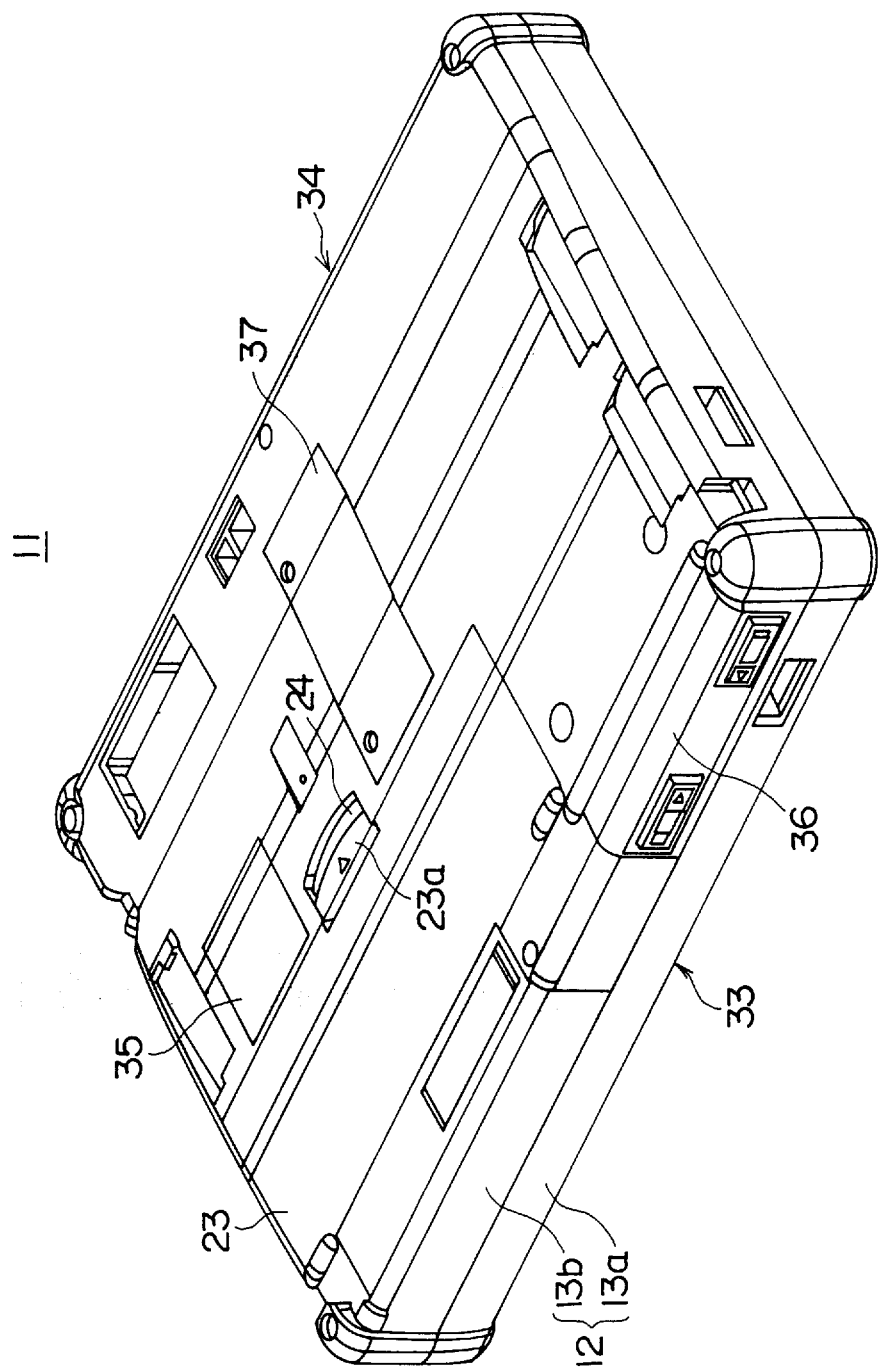
FIG. 4 is a perspective view of the handy-terminal from the bottom.

FIG. 3 is a diagram showing a perspective view of an embodiment of the handy-terminal 11 to which the present invention is applied. Also, FIG. 4 is a diagram showing a perspective view of the same handy-terminal 11 from the bottom. In FIG. 3, the handy-terminal 11 is comprised of a display-operation portion 31 and an accommodating portion 32. The entire shape of the handy terminal is determined by the housing 12 comprising an upper case 13a including the display-operation portion 31 and a lower case 13b including the accommodating portion 32.

The display-operation portion 31 is comprised of a display unit 33 and an operation unit 34 adjacent to the display unit 33 and including functional switches.

The accommodating portion 32 is used to accommodate control plates in addition to the first and the second batteries 15a and 15b, sub-batteries, memory cards, increased memory and so on. In this embodiment, compartments for the first and the second batteries 15a and 15b, the sub-batteries, the memory cards and the increased memory are formed as shown in FIG. 4 and each of them is covered by a respective cover, namely, a battery cover 23, a sub-battery cover 35, a memory card cover 36 and an increased-memory cover 37.

Figure 5:
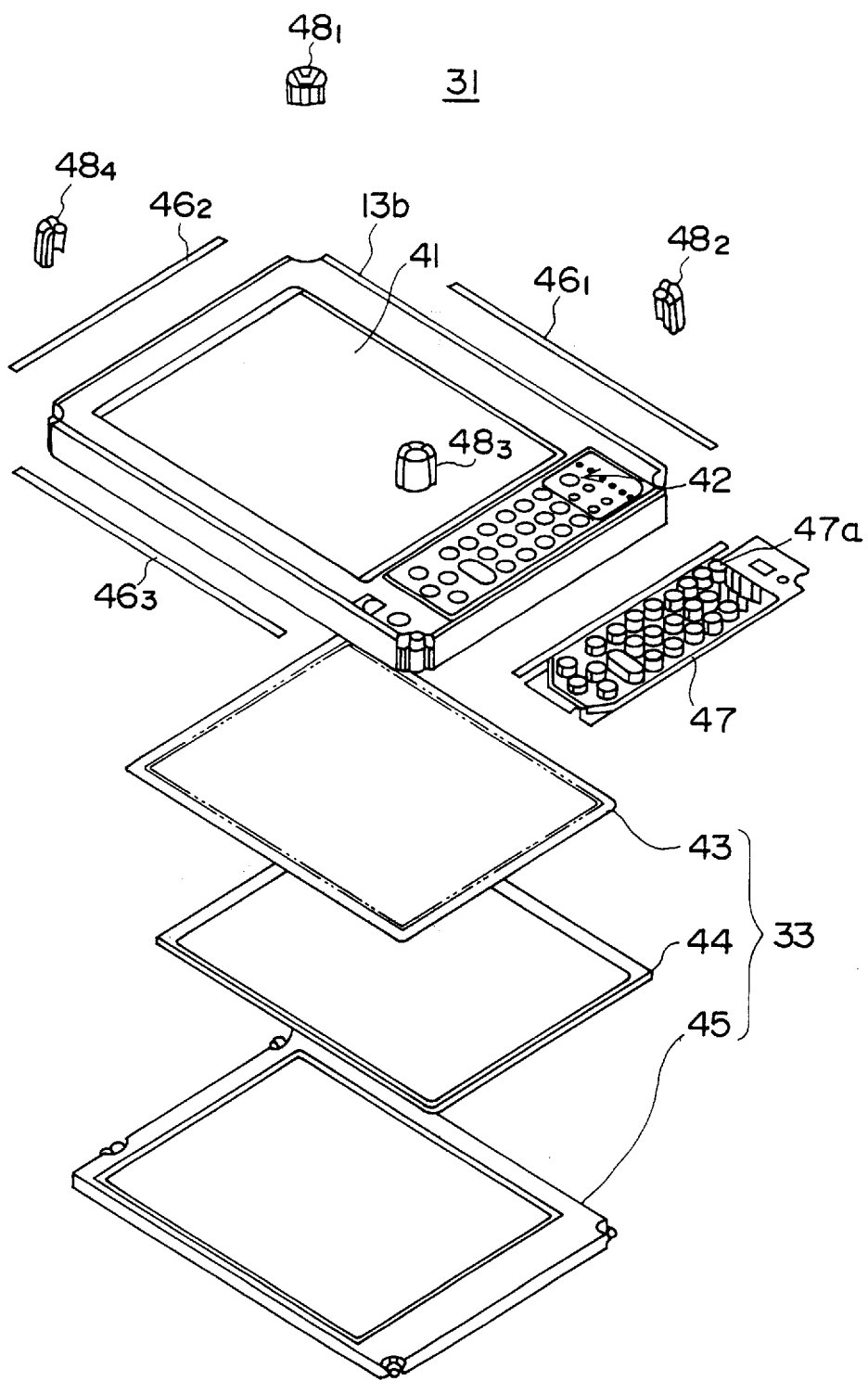
FIG. 5 shows an exploded view of a display-operation portion.

FIG. 5 shows an exploded view of the display-operation portion 31 shown in FIG. 3. In FIG. 5, the display-operation portion 31 is comprised of the upper case 13a having an opening 41 whose shape and size correspond to the display unit 33 and the operation unit 34 having a predetermined number of holes 42 corresponding to respective switches 47a. The display unit 33 is comprised of, for example, a glass plate 43, a liquid crystal panel 44 and a driver 45, and spacers $46_1$ to $46_3$ are also included.

A switching plate 47 on which various switches 47a are mounted is fixed to the upper case 13b so that each of switches 47a is projected through a respective hole 42. Then, corner fixing portions $48_1$ to $48_4$ are fixed to respective corners of the upper case 13a.

Figure 6:
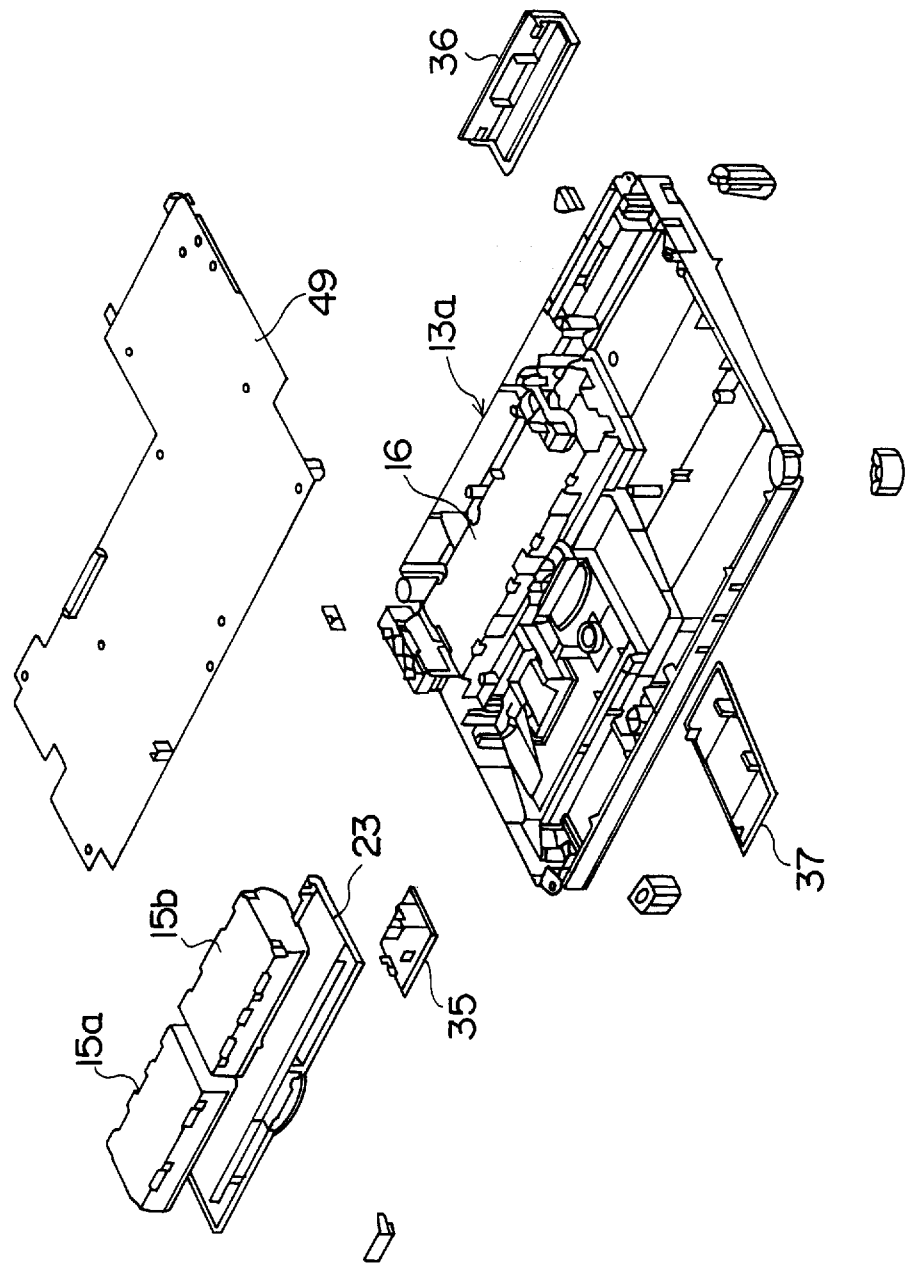
FIG. 6 is an exploded view of an embodiment of an accommodation portion according to the present invention.

FIG. 6 is a diagram of an exploded view of the accommodation portion 32 shown in FIG. 3. As shown in FIG. 6, the lower case 13b is partitioned for the first and the second batteries 15a and 15b, sub-batteries, memory cards, increased memory and so on and each of them is covered with the battery cover 23, the sub-battery cover 35, the memory card cover 36 and the increased-memory cover 37, respectively. Further, a middle plate 49 for dividing the display-operation portion 31 is mounted on the lower case 13b. In addition, corner fixing portions $50_1$ to $50_4$ (not shown) are fixed to respective corners of the lower case 13b and screwed to corresponding corner fixing portions $48_1$ to $48_4$ of the upper case $13b$.

Figure 7:
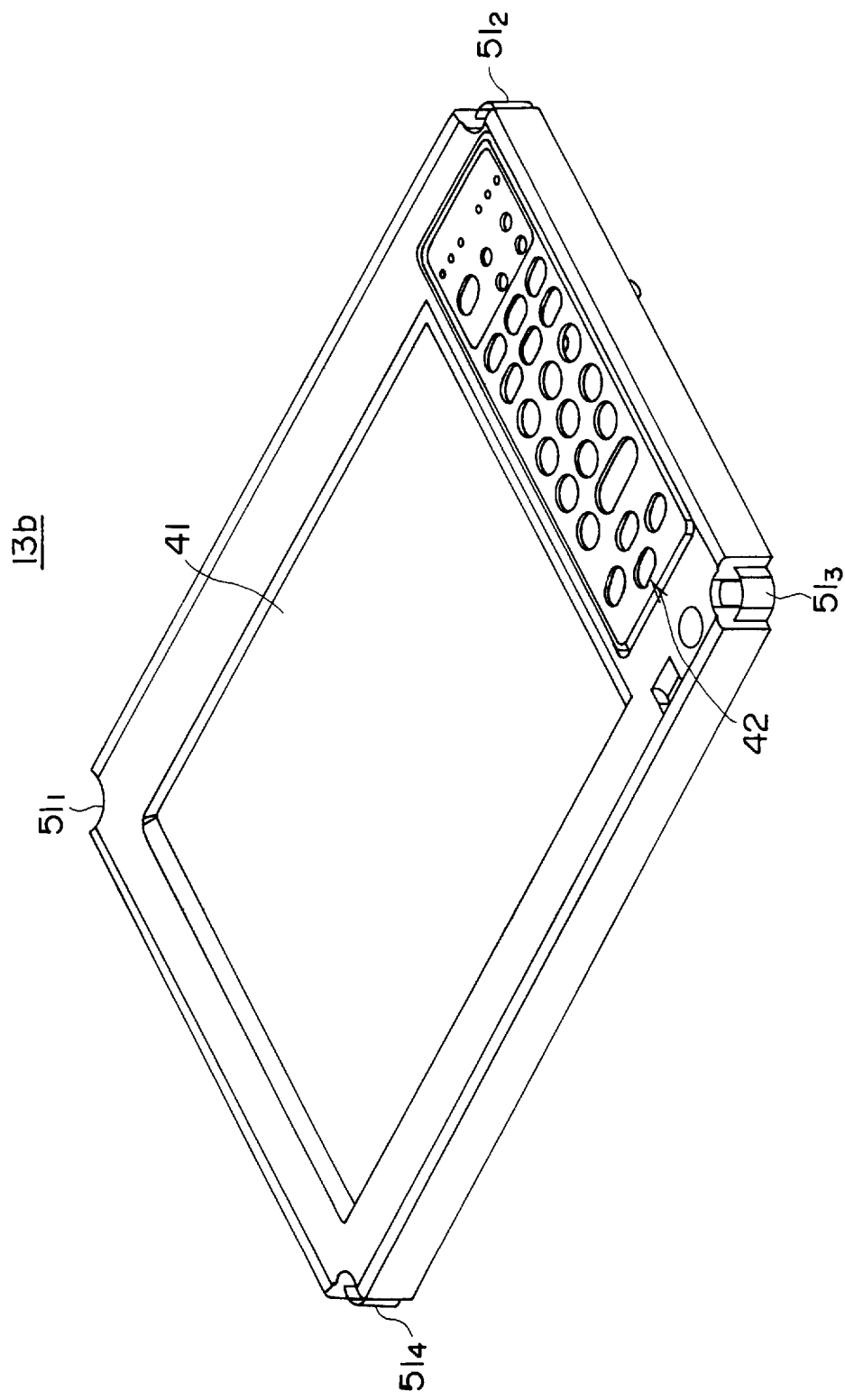
FIG. 7 is a perspective view of an upper case portion according to the present invention.
Figure 8:
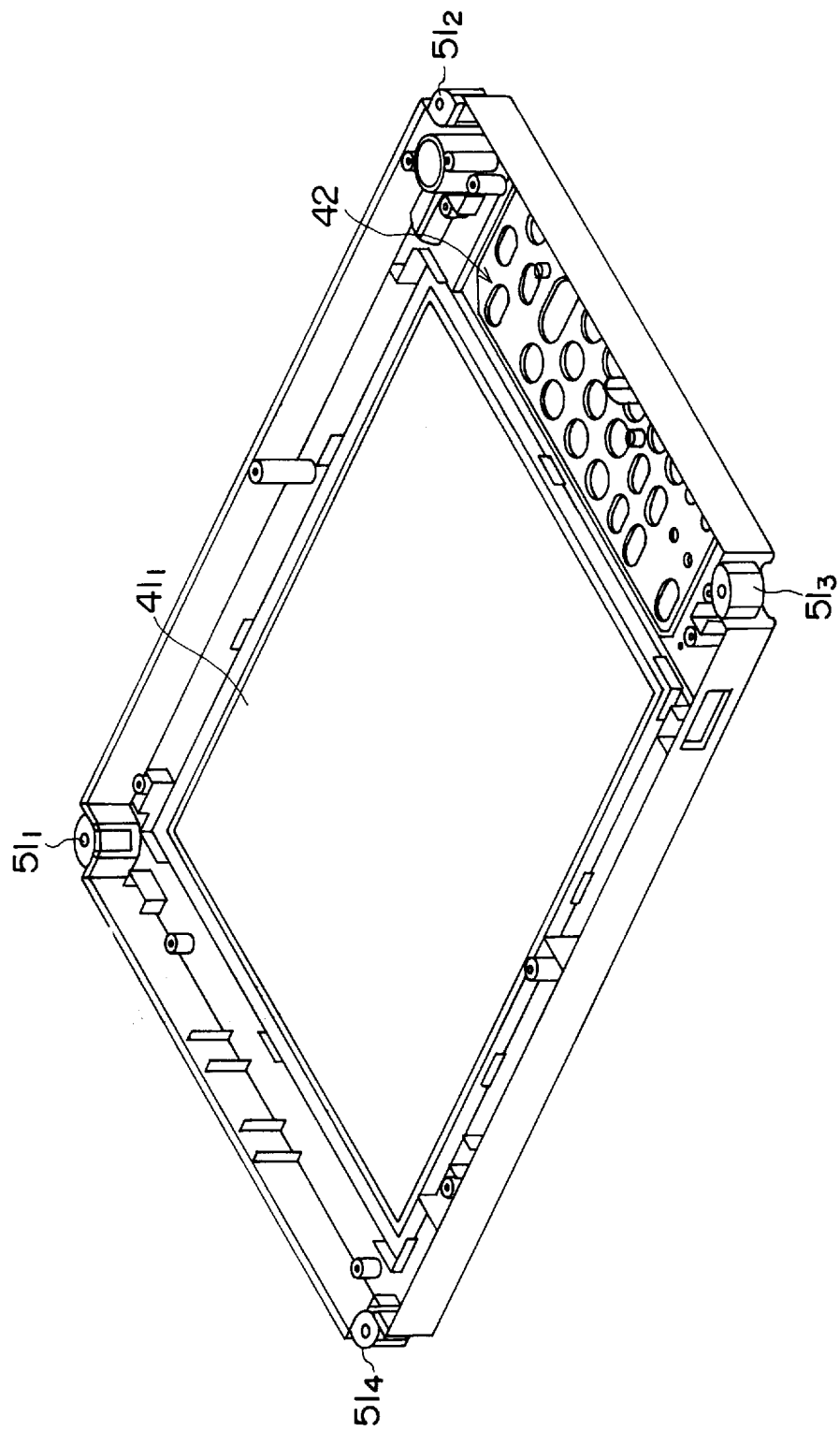
FIG. 8 is a perspective view of the upper case portion from the bottom.

FIG. 7 is a diagram showing a perspective view of the upper case portion $13a$ shown in FIG. 5. FIG. 8 is a diagram showing a perspective view of the upper case portion $13a$ from the bottom. The upper case $13a$ having the opening 41 and holes 42 corresponding to the various switches $47a$ can be made of a resin and formed by using, for example, an injection molding. Also, fixing plates $51_1$ to $51_4$ are integrally molded with the upper case $13a$. The fixing plates $51_1$ to $51_4$ are engaged with the corresponding corner fixing portions $48_1$ to $48_4$ of the upper case $13a$.

Figure 9:
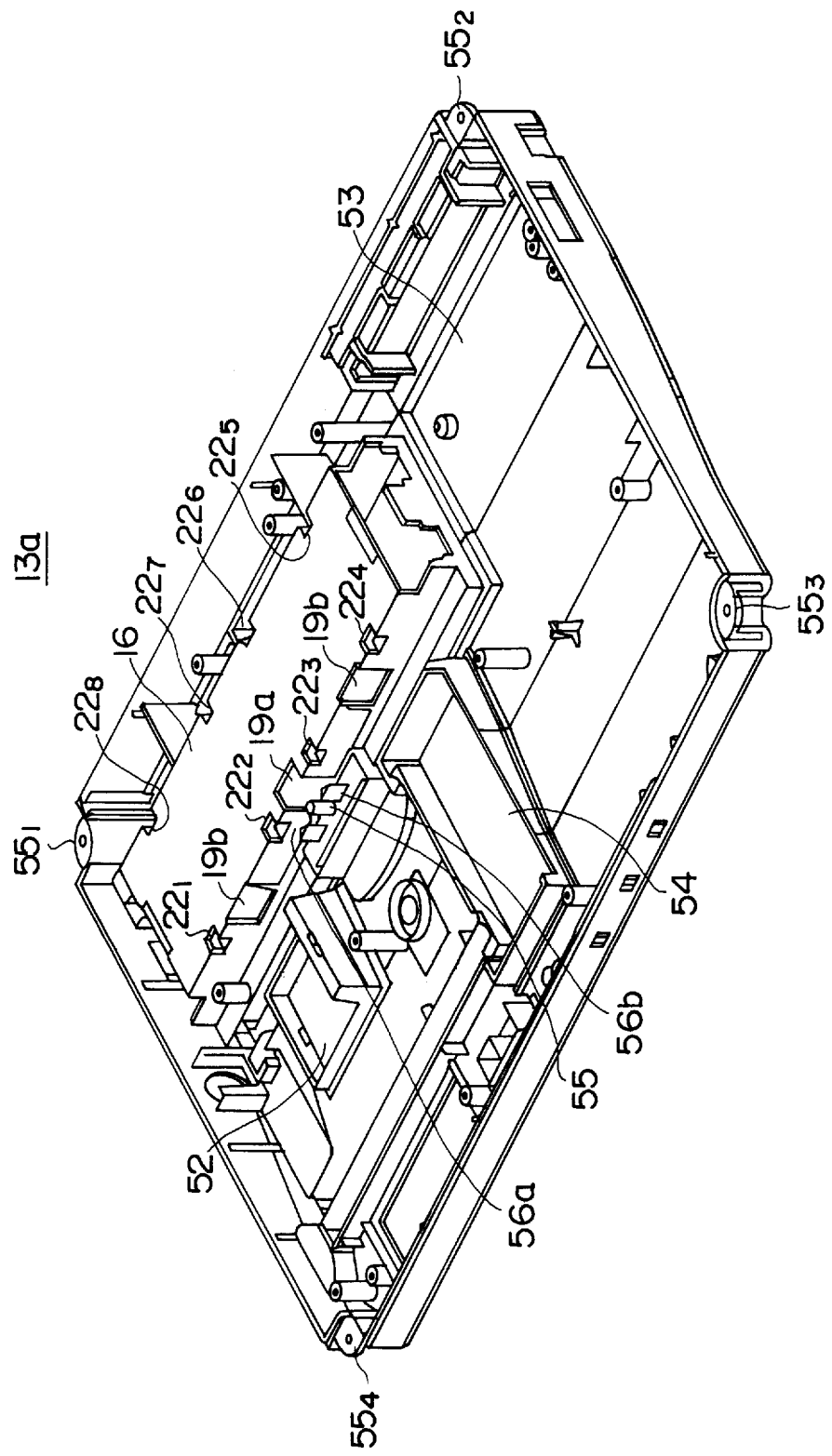
FIG. 9 shows a perspective view of a lower case according to an embodiment of the present invention.
Figure 10:
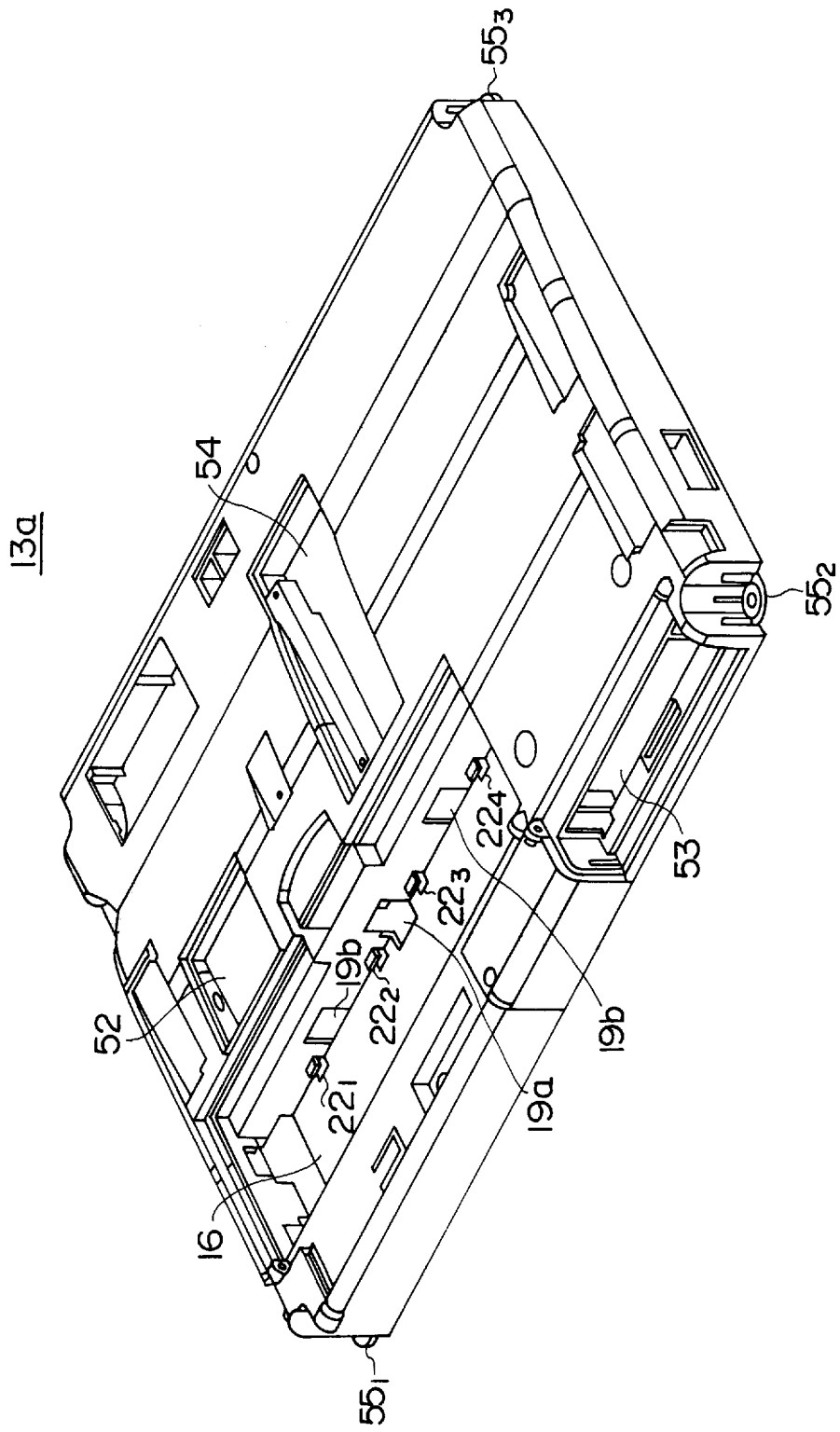
FIG. 10 is a perspective view of the lower case according to an embodiment of the present invention.

FIG. 9 shows a perspective view of the lower case $13b$ shown in FIG. 6. FIG. 10 is a diagram showing a perspective view of the lower case $13b$ from the bottom. The lower case $13b$ can be made of a resin and formed by using, for example, an injection molding. The lower case $13b$ is comprised of the battery case portion 16, a sub-battery case portion 52, a memory card case portion 53, an increased-memory case portion 54 and so on. Also, fixing plates $55_1$ to $55_4$ are formed at respective corners of the lower case $13b$.

The battery case portion 16, sub-battery case portion 52, memory card case portion 53, and increased-memory case portion 54 of the lower case $13b$ are covered with, as mentioned above, the battery cover 23, the sub-battery cover 35, the memory card cover 36 and the increased-memory cover 37, respectively. The fixing plates $55_1$ to $55_4$ are engaged with the corresponding corner fixing portions $50_1$ to $50_4$. Also, as mentioned above, the first and second holes $19a$ and $19b$ and the guiding members $22_1$ to $22_8$ are formed in the battery case portion 16.

A fitting portion containing pin 55 for fixing the locking member 21 is formed in the vicinity of the first hole $19a$ formed in the battery case portion 16 and supporting portions $56a$ and $56b$ are provided at respective sides of the fixing portion.

Figure 11:
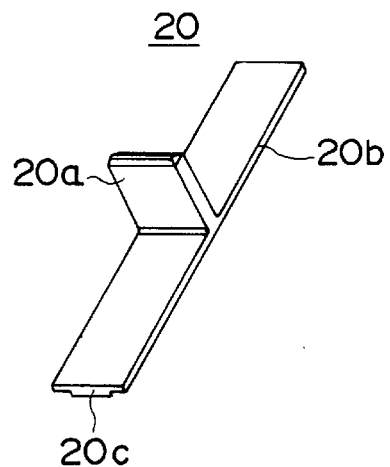
FIG. 11 shows a perspective view of a slide member according to an embodiment of the present invention.
Figure 12:
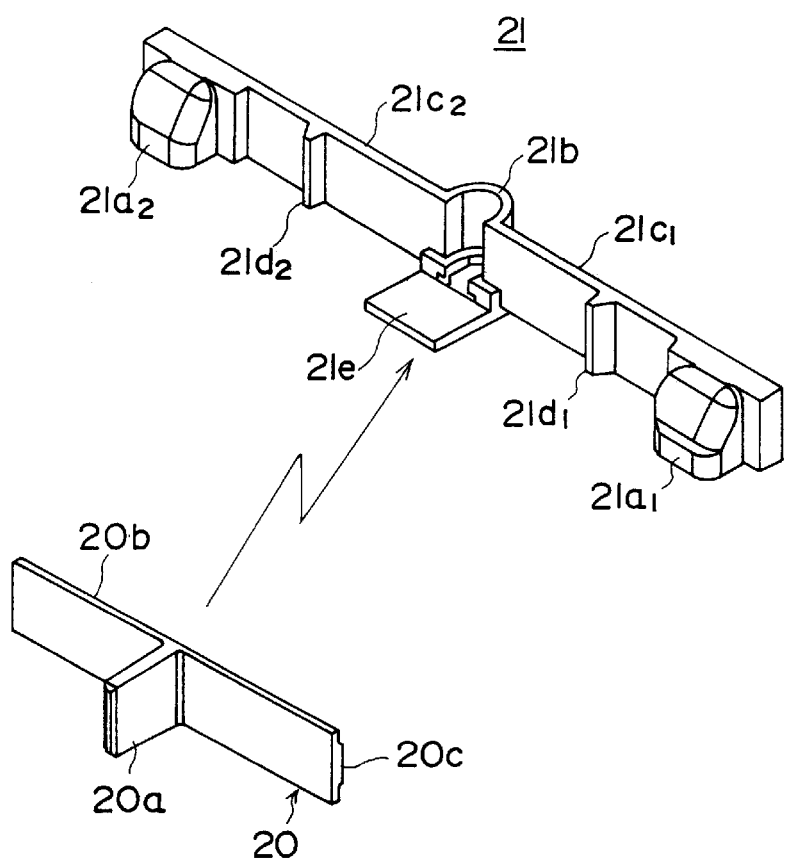
FIG. 12 shows a perspective view of a locking member according to an embodiment of the present invention.

FIG. 11 shows a perspective view of the slide member 20 shown in FIG. 2A. FIG. 12 shows a perspective view of the locking member 21 shown in FIG. 2A. The slide member 20 shown in FIG. 11 is made of a resin and the engaging portion $20a$ is integrally molded with the base portion $20b$. In this case, both ends $20c$ of the base portion $20b$ are in contact with the hooking portions $21d_1$ and $21d_2$ of the locking member 21.

The locking member 21 shown in FIG. 12 is comprised of a resin and can be integrally molded by, for example, injection molding. The locking member 21 is comprised of the fixing portion $21b$, arm portions $21c_1$ and $21c_2$ extending from the fixing portion $21b$ in a horizontal direction, and contacting portions $21a_1$ and $21a_2$ located at the end of the arm portions $21c_1$ and $21c_2$, respectively. As mentioned above, the contacting portions $21a_1$ and $21a_2$ are tapered. Also, the hooking portions $21d_1$ and $21d_2$ located substantially at the center of the arm portions $21c_1$ and $21c_2$ and extending in the same direction as the contacting portions $21a_1$ and $21a_2$ are formed. In addition, a plate portion $21e$ projecting in the same direction as the contacting portions $21a_1$ and $21a_2$ is integrally formed at a lower end of the fixing portion $21b$. The above-mentioned slide member 20 is mounted on to the pin forming plate portion $21e$ for sliding movement therealong.

With reference to FIG. 9, the fitting portion 55 is passed through the fixing portion $21b$ of the locking member 21 and fixed. At that time, the supporting portions $56a$ and $56b$ are in contact with the back of the arm portions $21c_1$ and $21c_2$, respectively. Also, the contacting portions $21a_1$ and $21a_2$ are projected through the second holes $19b$ formed in the battery case portion 16.

The engaging portion $20a$ of the slide member 20 is positioned on the plate portion $21e$ of the locking member 21 in a state that the engaging portion $20a$ is projecting inside the case portion. Thus, the slide member 20 is slidable (i.e., when both the first and the second batteries are loaded) within a width of the first hole $19a$ between the outside surface of the battery case portion 16 and the locking member 21.

Figures 13A, 13B:
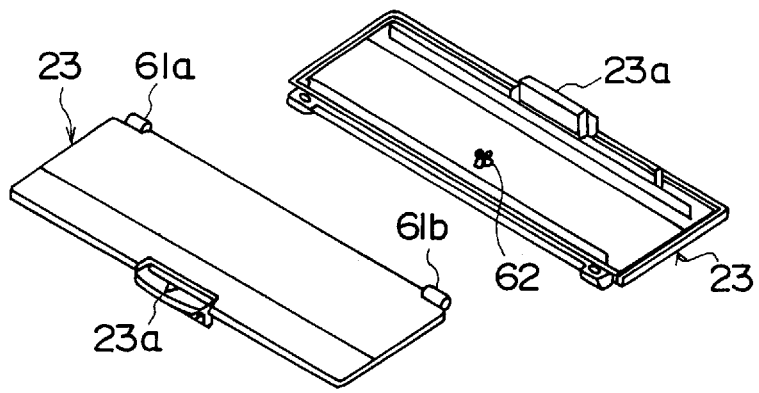
FIG. 13A shows a perspective view of a battery cover according to an embodiment of the present invention.
FIG. 13B shows a perspective view of the back of the battery cover according to an embodiment of the present invention.

FIG. 13A shows a perspective view of the battery cover 23 shown in FIG. 4. FIG. 13B shows a perspective view of the back of the battery cover 23. As shown in FIGS. 13A and 13B, the battery cover 23 is provided with fixing portions $61a$ and $61b$ to be used for fixing to the lower case $13b$ at the ends of a long side of the cover and the hook member $23a$ is formed on the central portion of the opposing side. Also, a projecting plate 62 of a cross shape is provided on the back of the battery cover 23 at a position corresponding to the third region $16c$ and at least a part of the projecting plate 62 which is in a long axis direction of the battery cover 23 is tapered.

The above-mentioned projecting plate 62 presses the first and the second batteries $15a$ and $15b$ from the third region $16c$ toward the terminal portions 17 and 18 when the battery cover 23 is closed and make sure of the electrical connection between the pin terminals $17a$, $17b$, $18a$, $18b$ and the terminals of the first and second batteries $15a_1$, $15a_2$, $15b_1$, $15b_2$, respectively.

Figures 14A, 14B:
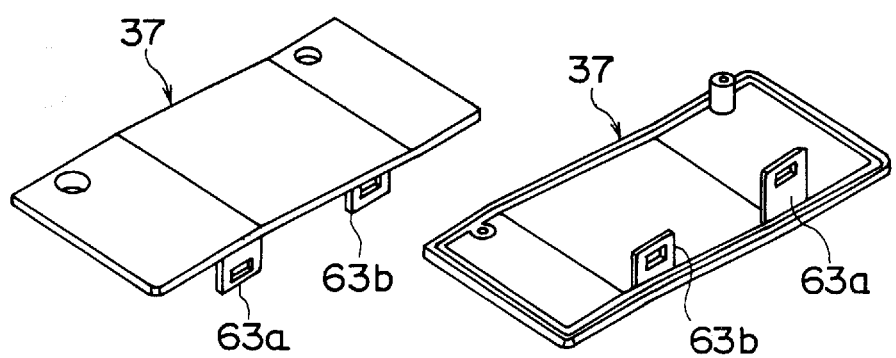
FIG. 14A shows a perspective view of an increased memory cover according to an embodiment of the present invention.
FIG. 14B shows a perspective view of the back of the increased memory cover.

FIG. 14A shows a perspective view of the increased-memory cover 37 shown in FIG. 4. FIG. 14B shows a perspective view of the back of the increased-memory cover 37.

As shown in FIGS. 14A and 14B, the increased-memory cover 37, which covers the increased-memory case portion 54 formed in the lower case $13b$, is integrally formed with engaging portions $63a$ and $63b$ engaging with corresponding portions of the lower case $13b$.

Figures 15A, 15B:
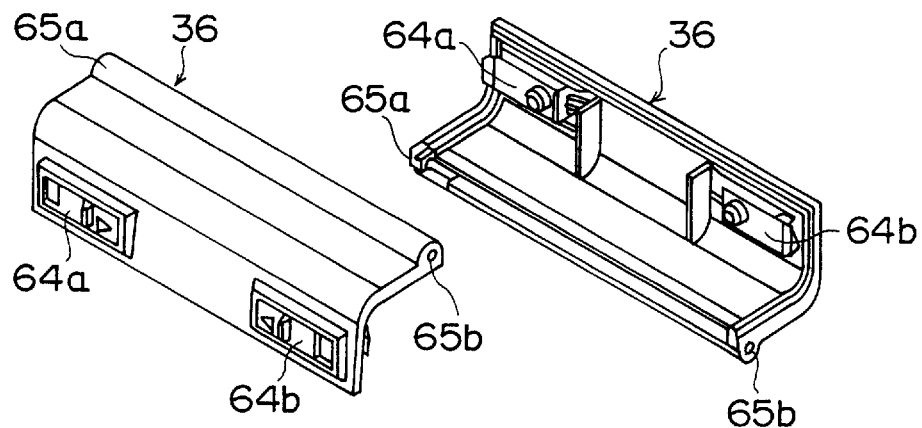
FIG. 15A shows a perspective view of a memory card cover according to an embodiment of the present invention.
FIG. 15B shows a perspective view of the back of the memory card cover.

FIG. 15A shows a perspective view of the memory card cover 36. FIG. 15B shows a perspective view of the back of the memory card cover 36. As shown in FIGS. 15A and 15B, the memory card cover 36 is formed so that its shape corresponds to the shape of the memory card case portion 53, and is provided with slide fixing portions $64a$ and $64b$ to be engaged with corresponding portions of the lower case $13b$. Moreover, fixing portions $65a$ and $65b$ to be hinged with the lower case $13b$ are provided at the other end of the memory card cover 36.

Figures 16A, 16B:
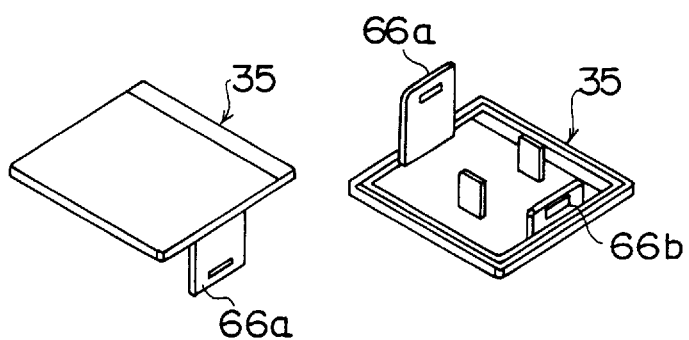
FIG. 16A shows a perspective view of a sub-battery cover according to an embodiment of the present invention.
FIG. 16B shows a perspective view of the back of the sub-battery cover.

FIG. 16A shows a perspective view of the sub-battery cover 35 and FIG. 16B shows a perspective view of the back of the sub-battery cover 35. As shown in FIGS. 16A and 16B, the sub-battery cover 35 is formed with engaging portions $66a$ and $66b$ engaging with corresponding portions of the lower case $13b$.

The handy-terminal 11 according to the present invention is provided with the resume function to save the content of data in a memory when the battery cover 23 is opened. A resume switch which detects an opening of the battery cover 23 is provided in the vicinity of the battery cover 23.

Figure 17:
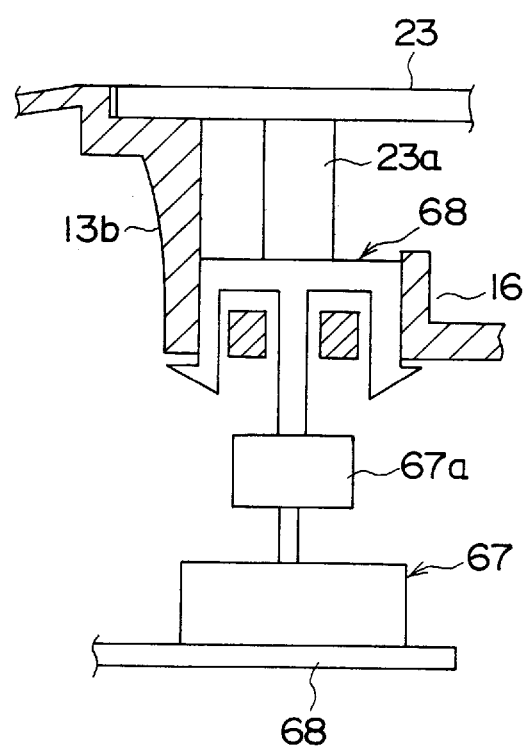
FIG. 17 is a diagram for explaining a resume switch.

FIG. 17 is a diagram for explaining the resume switch. For instance, the resume switch 67 is mounted on a printed circuit board 68 below the hook member $23a$ of the battery cover 23 in order to operate the resume switch 67 using the hook member $23a$. A relaying member 68 is provided between a button $67a$ of the resume switch 67 and the hook member $23a$.

The relaying member 68 is movably fixed to the lower case 13b and presses the button 67a of the resume switch 67 when the battery cover 23 is closed. The opening-up of the battery cover is detected since the switching state is reversed by a returning force of the button 67a of the resume switch 67 when the battery cover is opened.

Figure 18A:
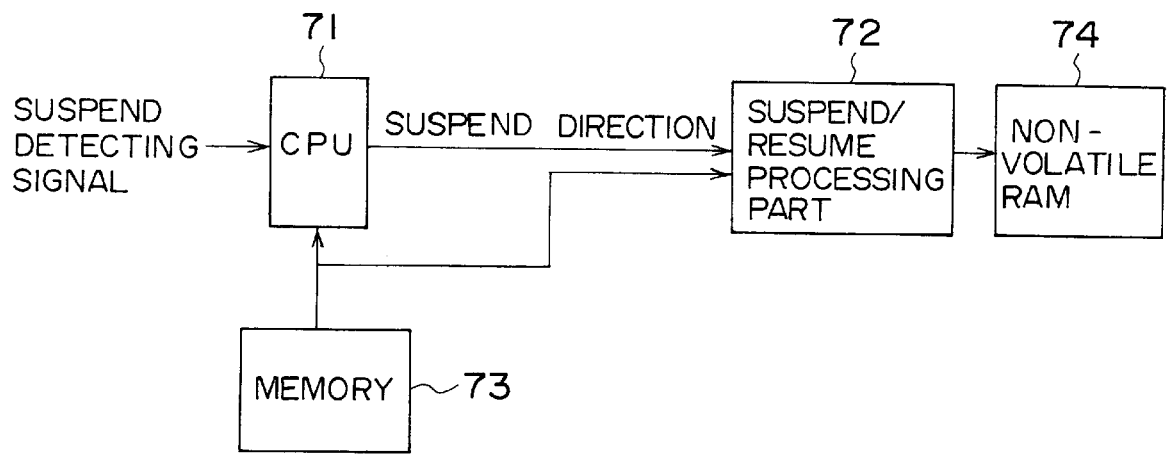
FIG. 18A is a general block diagram indicating a suspend process according to an embodiment of the present invention.
Figure 18B:
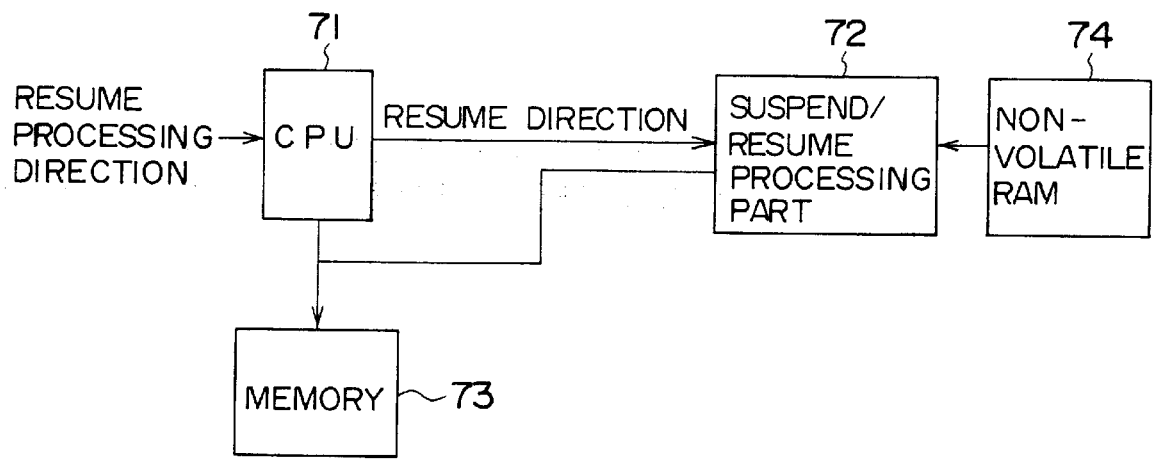
FIG. 18B is a block diagram in general indicating a resume process according to an embodiment of the present invention.

FIGS. 18A and 18B are block diagrams showing examples of a suspend/resume process by the handy-terminal. FIG. 18A is a general block diagram indicating a suspend process. FIG. 18B is a block diagram in general indicating a resume process. When a detecting signal from the resume switch 67 is input in a CPU 71, the CPU 71 sends a signal to a suspend/resume processing part 72 indicating carrying out a suspend/resume process. The suspend/resume processing part 72 reads data from a memory 73 and temporarily puts the data into, for example, a non-volatile RAM 74 when carrying out the suspend process, and writes the data in the non-volatile RAM 74 into the memory 73 when carrying out the resume process.

Figure 19A:
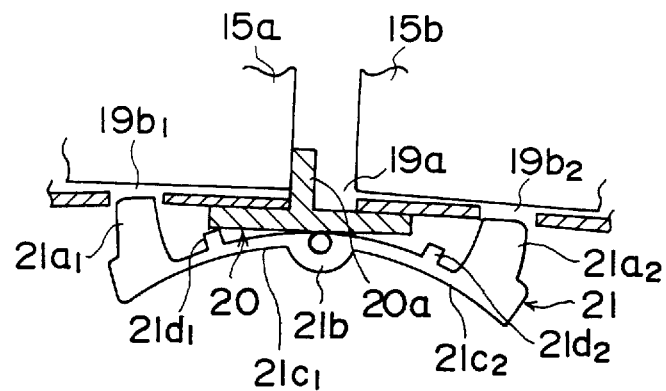
FIG. 19A is a diagram for explaining an operation of the slide member and the locking member according to an embodiment of the present invention.
Figure 19B:
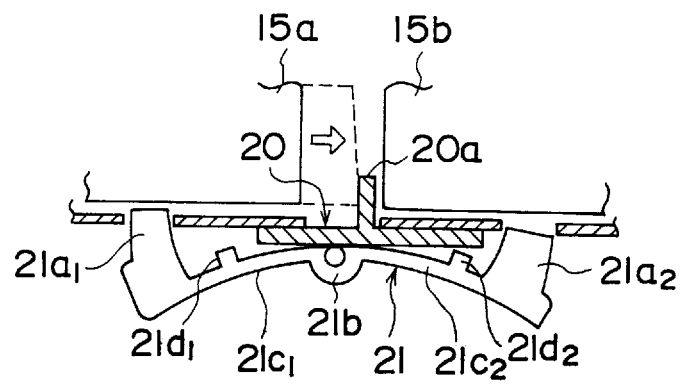
FIG. 19B is a diagram for explaining the operation of the slide member and the locking member according to an embodiment of the present invention.
Figure 19C:
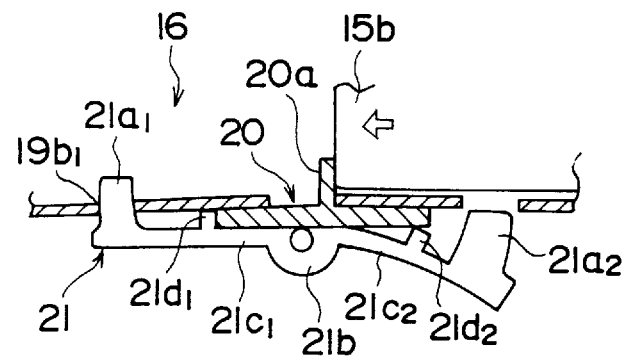
FIG. 19C is a diagram for explaining the operation of the slide member and the locking member according to an embodiment of the present invention.

FIGS. 19A to 19C are diagrams for explaining the operation of the slide member 20 and the locking member 21 shown in FIG. 2. In FIG. 19A, the first and the second batteries 15a and 15b are loaded in the battery case portion 16 and the contacting portions $21a_1$ and $21a_2$ of the locking member 21 are pressed by the batteries 15a and 15b, respectively. Thus, the hooking members $21d_1$ and $21d_2$ are separated from the slide member 20. In this state, the slide member 20 can move in both directions within the range of the width of the first hole 19a.

When the first battery 15a is taken out, as shown in FIG. 19b, the first battery 15a is moved in a direction indicated by an arrow so that its connection with the pin terminals (not shown) is released. At that time, the engaging portion 20a of the slide member 20 is pushed by the battery 15a and the position of the slide member 20 is shifted.

After the first battery 15a is taken out, as shown in FIG. 19C, the contacting portion $21a_1$ of the locking member 21 is projected into the battery case portion 16 through the second hole 19b and the hooking portion $21d_1$ is engaged with one of the ends of the slide member 20 to lock the slide member 20. In this state, it is not possible to move the second battery 15b in a direction indicated by an arrow in FIG. 19C and, therefore, the battery 15b cannot be taken out.

Also, when the second battery 15b is to be taken out, the first battery 15a is loaded in order to push back the contacting portion $21a_1$ and release the hooking member $21d_1$. Thus, it is possible to move the second battery 15b in the direction indicated by the arrow shown in FIG. 19C and take it out.

According to the present invention, as mentioned above, once one of the batteries is taken out from the battery case, it is not possible to take the other one out since the locking member 21 locks the slide member 20. Thus, the batteries must be taken out one by one, for example, during a battery exchange process. That is, a current is always supplied from one of the batteries and a loss of data due to electrical disconnection can be prevented. Further, the suspend/resume processes explained in FIGS. 18 and 17 are carried out in this state so that even if the capacity of the memory 73 is increased, it is possible to save all the data contained in the memory 73.

Also, according to the present invention, the slide member 20 and the locking member 21 are provided along the long axis direction of the battery case portion 16. Thus, only a small space is required for the locking mechanism and the size of the apparatus can be maintained small.

Moreover, according to the present invention, it is not necessary that both batteries 15a and 15b are loaded and only one battery is enough for supplying power. In that case, also, one battery may be released from the battery case only when the other battery is loaded in the other side.

Further, it is obvious that the present invention is not limited to the above-mentioned embodiment, and variations and modifications may be made without departing from the scope of the present invention.

What is claimed is:

1. A portable apparatus capable of using batteries as an energy source, comprising:

a battery case portion having walls forming a space defining a first region at one end of said space for containing a first battery, a second region at the other end of said space for containing a second battery, and a third region located between said first and second regions;

means forming openings in one of said walls communicating with each of said first, second and third regions, respectively;

a resilient locking member fixed to an exterior side of said one wall and having contacting portions arranged to extend into said first and second regions of said space when said first and second batteries, respectively, are absent therefrom, and being individually displaceable from each said region when each said region is occupied by a battery;

a slide member mounted on said apparatus for sliding movement in a direction between said first and second regions of said battery case portion, an engaging portion on said slide member operative to extend into said third region of said space and being movable to positions adjacent a battery occupying a region upon removal of the other battery from the battery case portion; and means forming a hooking portion on said locking member adjacent each said contacting portions and each being operative to engage said slide member when the adjacent contacting portion extends into said space of said battery case portion and thereby prevent simultaneous removal of both batteries from the battery case portion.

2. The portable apparatus as claimed in claim 1, wherein said locking member is fixed by a fixing portion disposed adjacent to said third region and is provided with two arm portions extending oppositely from said fixing portion in a sliding direction of said slide member, each of said arm portions having a contacting portion operative to be pushed down by an associated battery.

3. The portable apparatus as claimed in claim 2, wherein said hooking portion on said locking member comprises hooking members, each of which engages the slide member when a corresponding one of the first battery and the second battery is removed from said space and operates to be disengaged from the slide member such that the slide member is slidable when both the first battery and the second battery are loaded.

4. The portable apparatus as claimed in claim 1, wherein said slide member is moved, within a range of the width of said third region, according to the movement of one of said batteries by the presence of said engaging portion contacting said battery.

5. The portable apparatus as claimed in any one of claims 1 or 2 to 4, wherein a predetermined number of pin terminals for electrical connection with said batteries are provided at both ends of said battery case portion.

6. The portable apparatus as claimed in any one of claims 1 or 2 to 4, wherein said battery case portion is covered with a cover and detective means for detecting opening and closing of said cover is further provided.

7. The portable apparatus as claimed in claim 5, wherein said battery case portion is covered with a cover and detective means for detecting opening and closing of said cover is further provided.

8. The portable apparatus as claimed in claim 6, wherein pressing members for pressing said batteries in a direction for making electrical connection are further provided with said cover.

9. The portable apparatus as claimed in claim 7, wherein pressing members for pressing said batteries in a direction for making electrical connection are further provided with said cover.

10. A battery locking mechanism comprising:

a battery case portion including at least a first region and a second region providing a space for a first battery and a second battery, respectively, and a third region located between said first region and said second region utilized for loading and releasing only one of said first battery and said second battery, a slide member slidably disposed adjacent said third region and having an engaging portion which contacts one of said first battery and second battery, and a locking member operable to be engaged with said slide member when one of said first battery and said second battery is taken out from its associated region of said battery case portion, and to lock the other battery in its associated region.

11. The portable apparatus as claimed in claim 7, wherein pressing members for pressing said batteries in a direction for making electrical connection are further provided with said cover.

* * * * *